(12) United States Patent
Arnone et al.

(10) Patent No.: US 11,282,188 B2
(45) Date of Patent: *Mar. 22, 2022

(54) METHOD OF DYNAMIC DATA ACQUISITION

(71) Applicants: James L Arnone, Macomb Township, MI (US); Atilio R Steuer, Macomb, MI (US); Lawrence G Arnone, Algonac, MI (US)

(72) Inventors: James L Arnone, Macomb Township, MI (US); Atilio R Steuer, Macomb, MI (US); Lawrence G Arnone, Algonac, MI (US)

(*) Notice: Subject to any disclaimer, the term of this patent is extended or adjusted under 35 U.S.C. 154(b) by 109 days.

This patent is subject to a terminal disclaimer.

(21) Appl. No.: 15/287,844

(22) Filed: Oct. 7, 2016

(65) Prior Publication Data
US 2017/0024879 A1    Jan. 26, 2017

Related U.S. Application Data

(62) Division of application No. 13/239,356, filed on Sep. 21, 2011, now Pat. No. 9,464,890.

(60) Provisional application No. 61/384,987, filed on Sep. 21, 2010.

(51) Int. Cl.
| | |
|---|---|
| G06T 7/00 | (2017.01) |
| H04N 7/18 | (2006.01) |
| G01B 11/00 | (2006.01) |
| G01B 11/245 | (2006.01) |
| G01B 21/04 | (2006.01) |
| G01B 11/16 | (2006.01) |

(52) U.S. Cl.
CPC ............ *G06T 7/0006* (2013.01); *G01B 11/00* (2013.01); *G01B 11/245* (2013.01); *G01B 21/047* (2013.01); *H04N 7/181* (2013.01); *G01B 11/16* (2013.01); *G06T 2207/30164* (2013.01)

(58) Field of Classification Search
None
See application file for complete search history.

(56) References Cited

U.S. PATENT DOCUMENTS

| | | | | |
|---|---|---|---|---|
| 4,426,160 A | * | 1/1984 | Couderc | G01N 33/442 374/45 |
| 4,636,969 A | * | 1/1987 | Kyoden | G01B 11/16 250/559.15 |

(Continued)

OTHER PUBLICATIONS

Fraser et al., "Monitoring the thermal deformation of steel beams via vision metrology" ISPRS Journal of Photogrammetry & Remote Sensing 55 (2000) 268-276.*

(Continued)

*Primary Examiner* — John C Kuan
(74) *Attorney, Agent, or Firm* — Cargill & Associates, PLLC; Lynn E. Cargill (57) ABSTRACT

A dynamic data acquisition system is disclosed for continuously recording, measuring and analyzing test cycle data of dimensional changes of a work piece before, during and after climatic changes. An optional climate chamber with an environmentally encapsulated camera system may be used to control the climate during the test cycle. A method of operating the dynamic data acquisition system is disclosed, as well as a business method for the new business model created by utilizing the system.

4 Claims, 7 Drawing Sheets

(56) References Cited

U.S. PATENT DOCUMENTS

| | | | | |
|---|---|---|---|---|
| 5,394,208 | A | * | 2/1995 | Campbell .............. G03B 29/00 348/E5.026 |
| 5,592,151 | A | * | 1/1997 | Rolih ..................... G08B 17/12 250/342 |
| 6,767,127 | B2 | * | 7/2004 | Paganelli ............... G01N 25/16 356/625 |
| 7,025,499 | B2 | * | 4/2006 | Brinz ..................... G01B 11/16 374/121 |
| 2006/0247891 | A1 | * | 11/2006 | Fox ........................ G01B 11/16 702/155 |

OTHER PUBLICATIONS

James et al., "A review of measurement techniques for the thermal expansion coefficient of metals and alloys at elevated temperatures" Meas. Sci. Technol. 12 (2001) R1-R15.*

* cited by examiner

METHOD OF DYNAMIC DATA ACQUISITION

CROSS-REFERENCE TO RELATED APPLICATIONS

This application is a Divisional application of U.S. Utility patent application Ser. No. 13/239,356, filed on Sep. 21, 2011, which claims the benefit under 35 U.S.C. 119(e) of U.S. Provisional Application No. 61/384,987 filed on Sep. 21, 2010,

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED, INCLUDING ON A COMPACT DISC

Not Applicable

TECHNICAL FIELD

This patent application relates to continuous data acquisition, and more particularly relates to a dynamic data acquisition apparatus inside a controlled climate and a method of dynamically acquiring data for dimensional changes during climactic changes, as well as a method of doing business utilizing these apparati and methods.

BACKGROUND OF THE INVENTION

For centuries, manufacturers have measured the dimensions of their parts by taking measurements before and after certain experiments. Engineering of such testing systems may include product engineering, design development, and machine building services. For manufacturing concerns, conventional dimensional testing has occurred before and after various tests, including thermal and corrosion testing, to act as a comparison between the dimensions of the manufactured piece before and after being subjected to the thermal or corrosion testing. These comparisons provide the dimensional changes that occur as a result of heating, cooling, or after being subjected to various environments.

Over the years, such non-contact testing methods have evolved, but they still only provide data before and after. Data has not been yet taken during the test. Heretofore, systems have not been developed that could accurately provide the three dimensional coordinates of an object to an accuracy that yielded usable test data.

To add a new dimension to the test results, either frequently intermittent or fully continuous test data during the testing procedures would be very helpful to most product engineers. Those product engineers would welcome the ability to make dynamic data acquisitions inside a controlled climate chamber that will provide three dimensional measurements before, during and after testing so that they can see the complete picture of what happens to the dimensions of their product during exposure to elemental changes inside the chamber. "During" results may be taken at any desirable frequency, whether intermittent, frequently intermittent or continuous, thereby generating very desirable new test data. Correlating all this data into a computer generated report that shows a true picture of the dimensional changes that the product undergoes during a controlled climate change is most desirable.

SUMMARY OF THE INVENTION

The present invention includes an apparatus and method for providing intermittent or continuous three dimensional measurements in a dynamic environment, whether open to ambient conditions or within a controlled environment like a climate chamber, as well as a business model method for creating a business surrounding the technology. The apparatus and method of taking the dynamic measurements are very desirable for manufacturing engineers. In order to provide such dynamic measurements and reports, technology is needed that will be extremely accurate and very fast.

The present invention provides a dynamic data analysis whereby data can be taken by high resolution digital cameras continuously feeding measurements taken in a static or moving environment within a climate chamber. The ability to use dynamic data analysis will dramatically improve engineering and design evaluations or decisions. Once a data point has been acquired while a part is static or moving, additional data received thereafter will provide point comparisons and much more information, including pictures, videos, vectors and magnitudes, and graphical comparisons that are necessary for engineering decisions.

This new technology could re-define industry processes and standards for environmental engineering. Traditional coordinate measuring machine services will no longer be needed. Our business model will include continuous, or near continuous, acquisition of data from dynamic processes inside a climate chamber, along with precise digitizing of medium to large-sized objects as they deform in motion and position after being subjected to environmental changes in the chamber. The root causes of various conditions can easily be determined by the constant measurement taking during the testing procedure.

For example, deformation analysis will help to provide defect analysis in a production line, such as during welding. Component behavior in wind tunnel and climate chambers can easily be tracked during the entire range of experiments. Collision damage can be analyzed every step along the way during a collision. Furthermore, material testing and structural analysis can provide valuable information during environmental changes.

Motion and position analyses, including door slam testing and structural analysis of the closure process for automobile hoods, convertible tops, and windows, can easily be achieved by this testing and analyzed by engineers throughout the process. In addition, body component vibrations may be tested and analyzed, as well as infinitesimally small increments of industrial robot motion control, along with machine vision, can be calibrated and corrected instantaneously by a computer once the information from this analysis is input into their systems.

Traditional testing only produced two sets of data, before and after. The present invention provides unlimited data points during the test, and also provides sets of data before, during and after the tests. Furthermore, the test data can be instantaneously analyzed by computer and then can be correlated into charts, diagrams, and all the information needed to correct engineering defects at a moment's notice. Traditional testing only provided page after page of point data information to correlate and review, while the present invention provides video, picture, and three dimensional point data which allows for quick evaluation, analysis, and correction if needed.

In the past, conventional testing required enormous amounts of time for evaluation and determination of point data trends, while the present invention provides real-time graphical and visual correlations between the three dimensional point data and the actual part being tested. The calculations are all done by computer, and the results are essentially instantaneous.

As the test is performed, engineers want to watch the dimensional changes take place on a computer screen in front of them so that they can see which portion of the components change dimension during the entire test.

Further, product engineers would be interested in utilizing a business method that would provide a business model of setting up a new service business to provide on-demand testing for manufacturers of automotive, aerospace, defense, marine, consumer goods, semiconductor, alternative energy component manufactures, among others. A licensee of this technology and software would be able to sell this testing service to these manufacturers to test new products and their reaction to swings in levels of temperature, moisture, light, or other fatigue or corrosion tests. Perhaps a manufacturer would want to test a new prototype for fatigue and corrosion before putting the part into production. Failure rates could be predicted in a more exacting and comprehensive manner.

BRIEF DESCRIPTION OF THE DRAWINGS

A more complete and full understanding of the aspects and nature of the present invention will become apparent upon considering the following detailed description, when taken in connection with the accompanying drawings, wherein.

DETAILED DESCRIPTION OF THE INVENTION

Therefore, in accordance with the present invention, a dynamic data acquisition apparatus and method of using the same, along with a business model method therefor is disclosed.

1. Dynamic Data Acquisition

The dynamic data acquisition apparatus may comprise many components, including a high resolution camera system, a climate chamber, a substantially climate proof container for containing the camera system within the climate chamber, a system of comparative scales and measuring devices, a computer program for receiving digital photographs from the camera system to be used for generating continuous or intermittent reports, along with other components that can dynamically register continuous or intermittent three-dimensional changes in a part that is being tested while the test is ongoing. As mentioned above, previous methods took "before" and "after" pictures of a part that had undergone climactic changes, and then the difference in dimensions were determined by subtracting one from the other, thereby telling what dimensional changes had taken place.

In a first aspect of the present invention, these dimensional changes are cataloged individually and collectively during the test, as well as cataloging before and after pictures. This provides engineers with an enormous amount of advantageous information that tells what the work piece is doing during the climactic changes.

In pursuance of the method of the present invention, a test piece or work piece is placed inside a climate chamber, and then the climate parameters are systematically changed, while digital calibrated pictures are being taken of the part, and dimensional changes are checked against calibration tools within the climate chamber. This allows an engineer to watch the dimensional changes in the X, Y and Z directions. These measurements taken before, during and after the test are fed into the computer system and they are measured relative to a calibration that is inside the chamber. Computations are made by the computer system to provide desirable data needed by the engineers to determine what is going on while the part is being heated, cooled, and subjected to various humidity levels.

If an engineer needs to know how heat, cold and humidity will affect a part, the present invention will be able to provide very important key data, while the changes are taking place, so that the engineer can provide all sorts of measurement analyses while the part is being subjected to changes in those parameters of heat, cold and humidity. Just imagine what a wonderful thing it would be for an engineer to be able to follow the exact dimensional changes that an automotive part goes through as it is heated from a first lower temperature to a second higher temperature. Also imagine how important it would be for an engineer to be able to understand the dimensional changes by various parts made of different materials, each having a separate coefficient of thermal expansion, as those parts are subjected to extreme humidity and extreme dryness. As one of ordinary skill in the art can imagine, those dimensional changes may be critical when selecting materials for certain performance characteristics for various parts. For example, a soft porous component may shrink differently when subjected to very low temperatures versus comparing those changes to the swelling that occurs when the same component is subjected to high humidity or steam for any length of time.

In another aspect of the present invention, metallic components of a system can be tested at various temperatures, i.e. a metal component for a bridge spanning over a river will contract when exposed to very low temperatures like −20 degrees Fahrenheit. Further, they will expand at +100 degrees Fahrenheit in a hot summer condition. These measurements are very involved, normally, and knowing the changes in the dimensions will provide a specifications engineer with the necessary dimensional stability requirements needed for those various components. In the instance of automotive engineers, they know that dimensional changes occur during braking, and that the metal pieces that hold a disc pad will expand and contract dependent upon temperature. This will be able to predict failure under certain circumstances.

Now that we have reviewed the basics of why a dimensional measurement is necessary under heating, cooling and humidity conditions for certain engineering aspects, we will look at how the present inventors have overcome this problem, and have provided a new, non-obvious dynamic data acquisition apparatus system and method for providing these detailed measurements.

Figure 1:
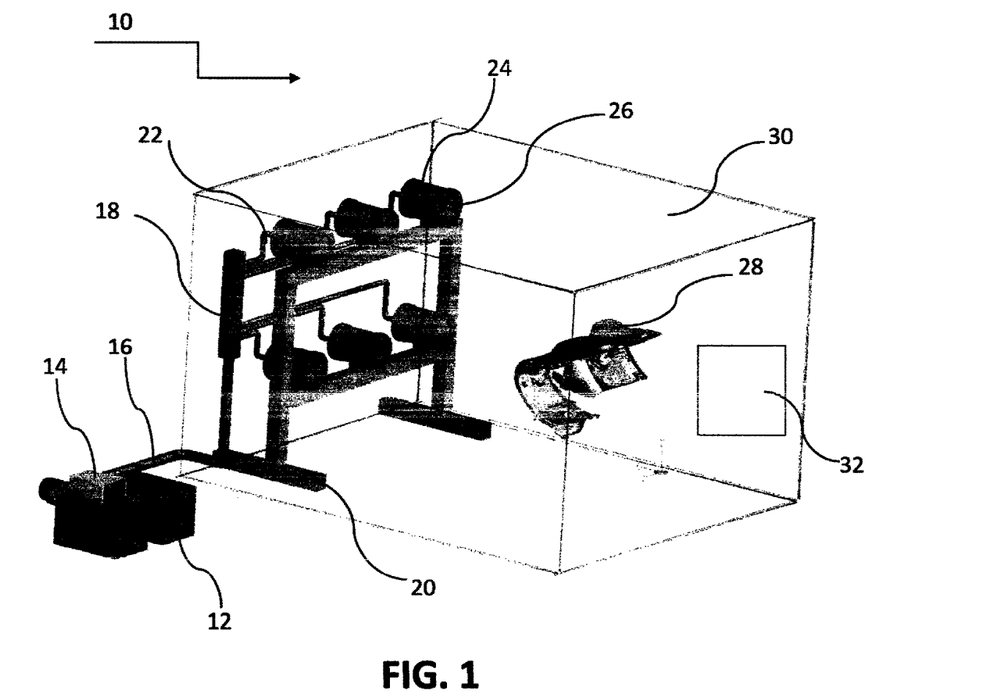
FIG. 1 is a perspective view of a test chamber outfitted with the dynamic data acquisition equipment made in accordance with the present invention, shown analyzing an automotive part.

Referring now to the drawings, FIG. 1 illustrates a perspective view of a first aspect of the present invention which includes a climate chamber generally denoted by the numeral 10. An environmental control unit 12 is in electrical communication with computer system 14 that is attached to conduit 16 for network cables and coolant chambers. Manifold 18 acts as a distribution center for the network cables and coolant lines. Various components of the present invention are mounted onto a frame 20, holding all of the components within the environmental chamber 30. Conduit lines 22 are used to distribute coolant which acts to protect cameras 26 located within environmental cases 24. Cameras 26 will be used to take digital pictures of the work part 28 relative to markings on calibration tool 32 which is also inside the environmental chamber 30.

In operation, the interior of the environmental chamber 30 is either heated, cooled or subjected to extreme humidity changes. Cameras 26 are mounted within the environmental cases 24 inside the environmental chamber in order to be able to focus carefully on a work part 28 during the heating, cooling or humidity cycle. The work parts also experience those climactic changes. Cameras 26 take a multiplicity of digital images relative to calibration tool 32, thereby giving relative dimensional change information and feeding that information through network cables back to the computer system 14 for analysis and manipulation. Computer system 14 will relay this information back to a video screen so that engineers can follow the dimensional changes as they occur.

In several aspects of the present invention, this dynamic measuring system 10 will provide dimensional measurements and controls for various industries, including, but not limited to automotive, aerospace, defense, marine, consumer goods, semi conductor and alternative energy industries.

Generally, the present invention utilizes data collection under any type of temperature or humidity conditions within a climate chamber, or the equivalent conditions in an environment. The cameras utilized by the present invention can capture dimensional changes from −70° C. to more than +170° C., with ±50° C. utilizing thermal wraps. The accuracy of these cameras can be as good as 0.010 to 0.050 mm or up to 0.002 inches.

In one aspect of the present invention, one suitable camera system is commercially available from AICON INC., of Germany, although other suitable camera systems may be utilized. Another such suitable camera is the Prosilica GC1600/1600C utilizing GigEVision™, a trademark of the Automated Imaging Association, commercially available from Prosilica, Inc. of Burnaby, British Columbia Canada. Any of these cameras can be assembled into an environmental housing to protect them from the environment, and take images while the experiment goes on. Suitable computer software for producing one of the most suitable test result analyses is also proprietary software owned by AICON, INC. of Germany, exclusively licensed to the present inventors.

Suitable cameras may have high resolutions from 1024× 768 and better. Especially useful would be a small digital camera having a resolution of at least 1620×1220, and especially one with a high gigabit interface with a frame speed of at least 10 frames per second at the above mentioned resolutions in order to deliver a large amount of pictorial data in a short amount of time. In one aspect of the present invention, an ultra-compact high Megapixel CCD camera that incorporates a Sony CCD sensor for providing monochrome and color image quality is used for best advantage.

Figure 2:
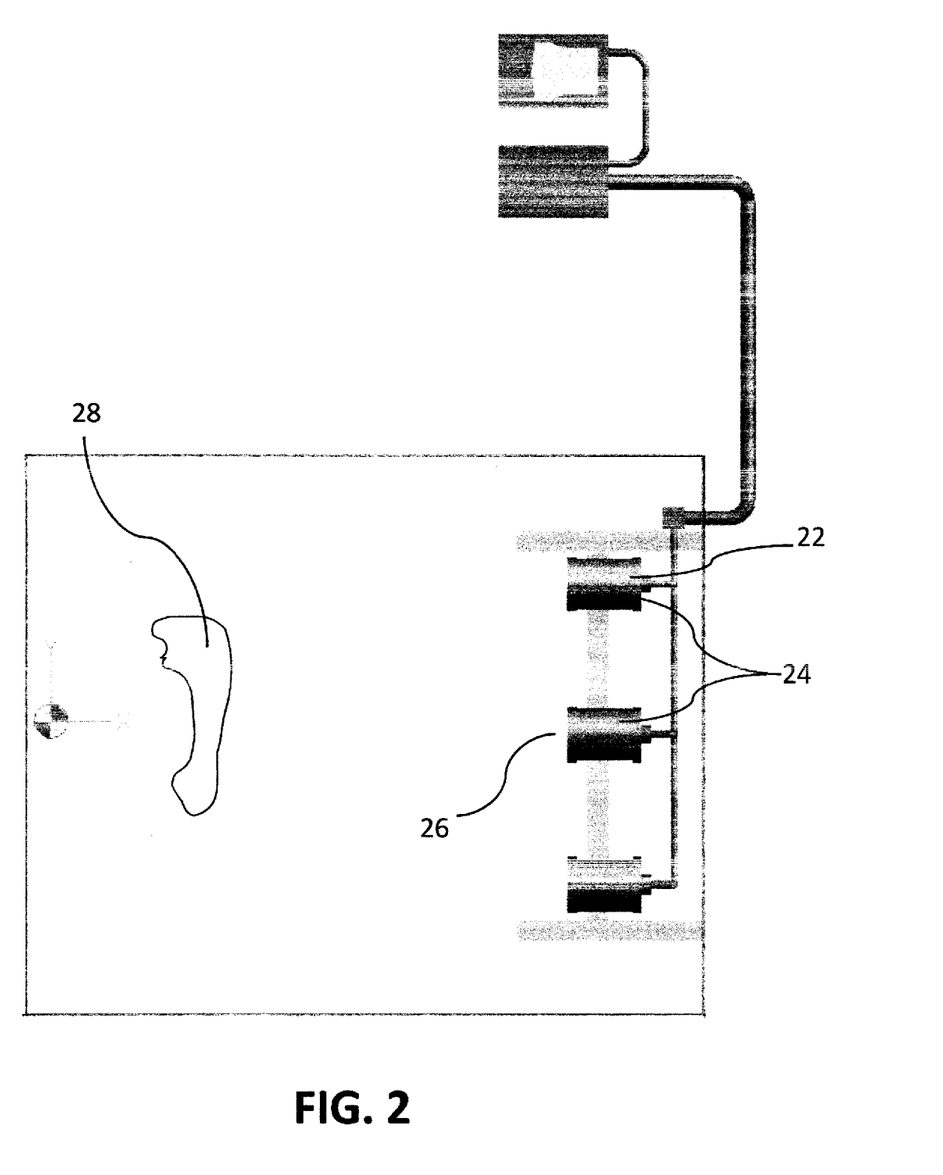
FIG. 2 is a perspective view of a dynamic camera used in said analysis.

FIG. 2 shows camera 26 within an environmental casing 24 that may be temperature controlled, heated or cooled by fluid lines located within conduit 22. The environmental case 24 is individually and independently climate controlled to keep the camera 26 at a constant temperature so that the dimensions of the digital images are constant for a more accurate reading of the dimensional change on the work part 28. This accuracy will generally provide more reliable data for the experiment.

Figure 3:
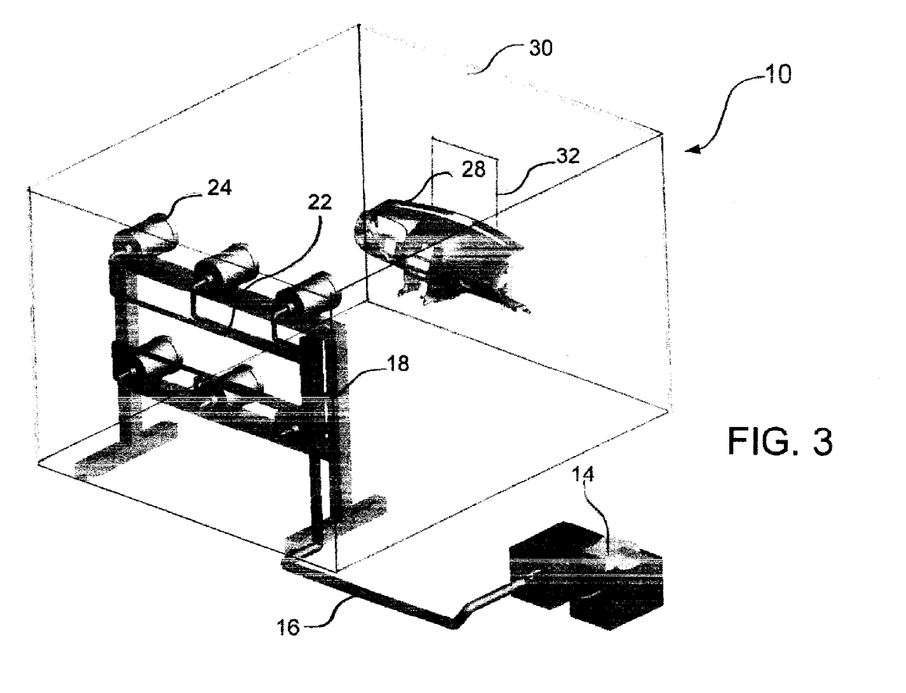
FIG. 3 is a rear perspective view of the test chamber of FIG. 1.

Looking now to FIG. 3, there is shown a rear perspective view of the climate chamber generally denoted by numeral 10, showing the relative placement of the work part 28 compared to a calibration tool 32. Conduit 22 contains heat exchanging fluid lines for heating or cooling materials that are designed and adapted to keep the environmentally controlled cameras that are located within the camera housings 24 at a constant temperature of optimum operation in order to maximize the resolution of the digital images created by the cameras.

Figure 4:
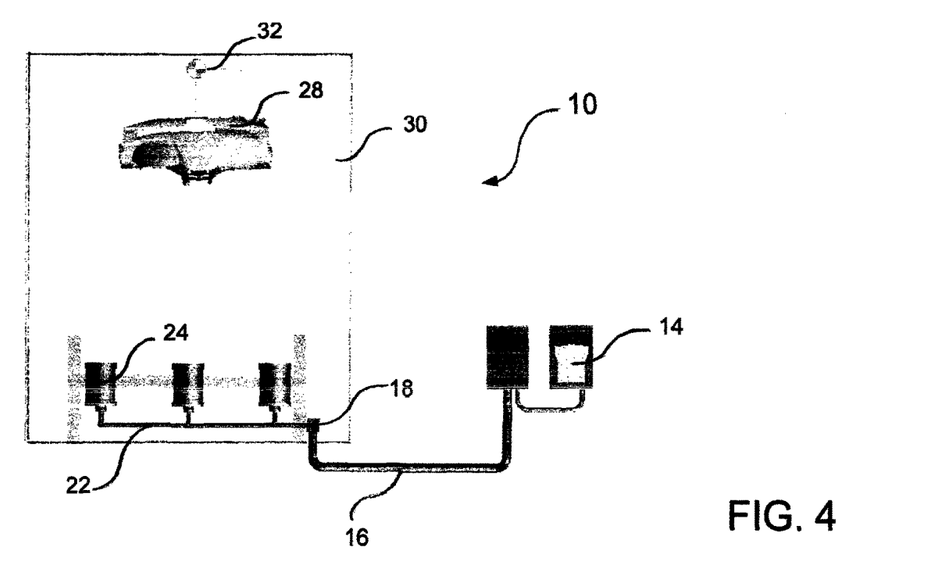
FIG. 4 is a top plan view of the relative placement of the various components of the present invention.

We now look at FIG. 4, which is a top plan view of the environmental chamber 30, the computer component sections 14 and the calibration tool 32. As one can see from this angle, the environmental camera cases 24 which contain cameras 26 (not shown in this view) take thousands of digital images of the work part 28 as it expands and contracts in reaction to heating and cooling within chamber 30. If humidity tests are to be done, they may also be done within climate chamber 30. Work part 28 expands and contracts depending upon the temperature of the environment within environmental chamber 30, and the digital imagery created by the cameras is always in relation to calibration tool 32, whereby the digital data collection can effectively be used to register data points continuously throughout a thermal cycle test or any other type of environmental control testing.

Figure 5:
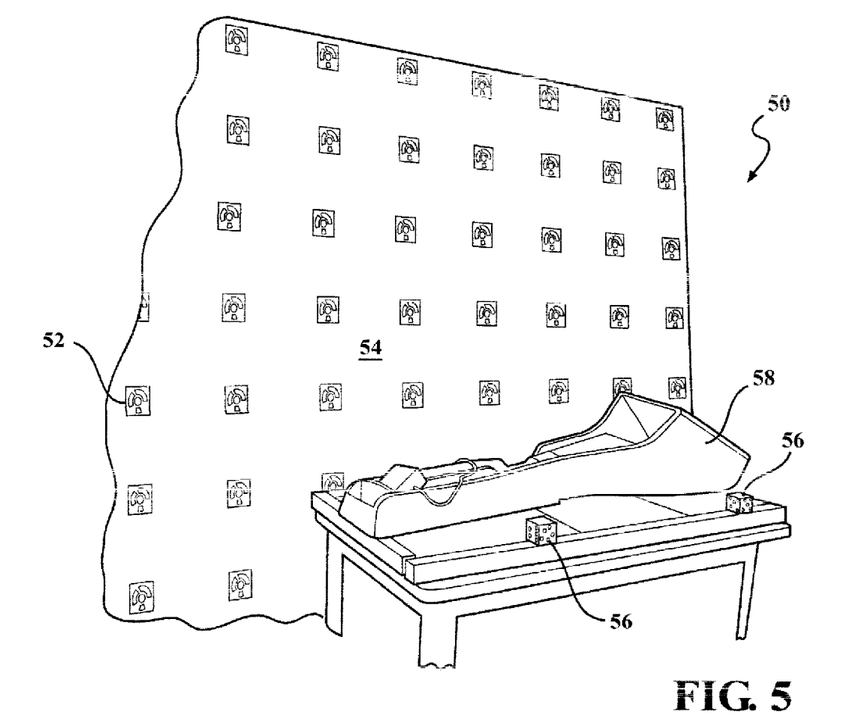
FIG. 5 is a calibration tool showing the work piece measurement being taken.

FIG. 5 illustrates a calibration tool generally denoted by numeral 50, including targets 52 on a calibration tool 54. Digital cameras not shown in this Figure are directed toward calibration tool 50 and adapters 56 for making reference points against the work piece 58. The targets also appear present on adapters 56 such that when the digital camera takes its image against work piece 58, the target pattern on the side of adapters 56 and the target pattern on the back tool 54 provide relative dimensional calibrations against the side of work piece 58. It is through measuring between all of these various targets and points against the work piece that the change in dimension can be recorded.

In yet another aspect of the present invention, the gaps, edges, holes and points on the work piece can be followed by digital imaging and feeding those images into a computer for complex analyses of the dimensional changes while the work piece is being subjected to climactic changes within the climate chamber itself. These measurements, once analyzed by the computer, provide a veritable library of resources that can be calculated to provide any data that an engineer may wish to measure during the test.

Figure 6:
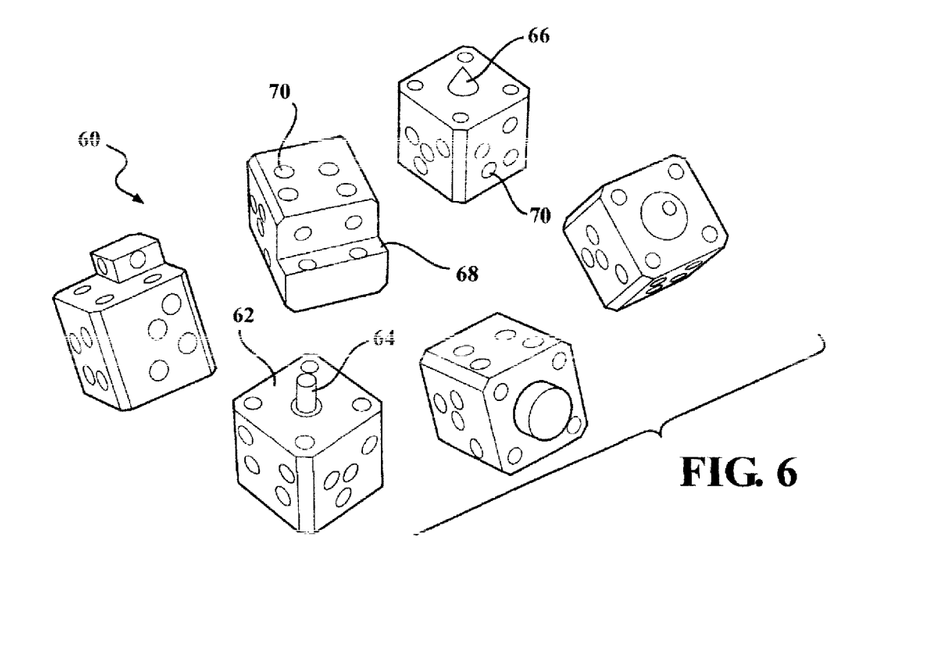
FIG. 6 illustrates various adapters usable in performing the method.

Looking next to FIG. 6, there are shown various adapters generally denoted by numeral 60 which include multiple faces 62 and protuberances 64 and 66. Although most of adapters 60 are equi-faced, some of the adapters have a multi-step configuration 68. Further, targets 70 appear on all of the adapters in order to provide target points. Adapters 60 are positioned and/or located at features on the work piece, and especially in hidden places on the work piece, such as apertures, holes, indents, and other features that are hidden from the digital image of the digital cameras. For example, cone 66 is a self centering adapter that helps to calculate edges, points, and hidden features on the inside edge of a work piece. For example, multi-step 68 helps calculate hidden features on the inside edge of a work piece. The adapters utilize targets on their various faces to give a digital camera reading of dimensional changes as they occur. The adapters can be attached, located or positioned by any known means, including gravity, magnetic bits, tape, or any other suitable means for securing the adapter in a place where the adapter will not be knocked over or taken out of position.

Figure 7:
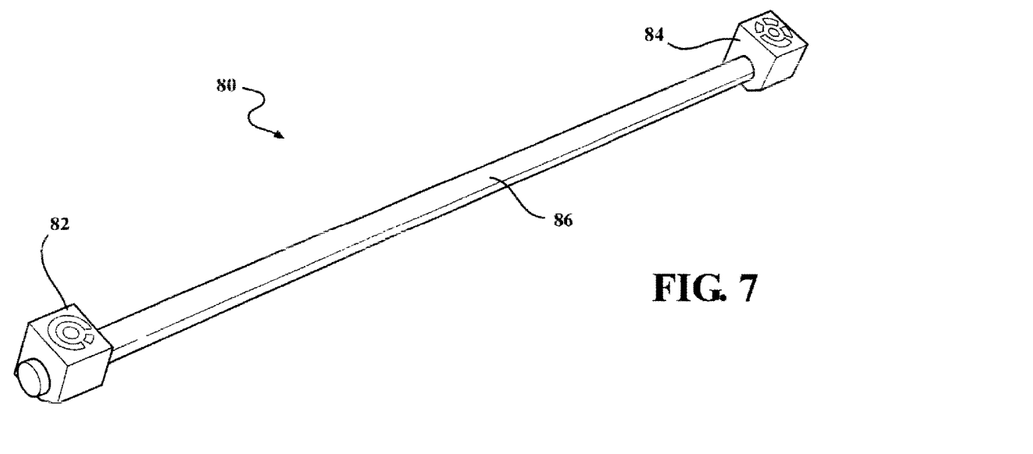
FIG. 7 shows a scale bar calibration tool in accordance with one aspect of the present invention.

FIG. 7 shows a perspective view of a scale bar calibration tool generally denoted by numeral 80 which is useful with certain aspects of the present invention. Scale bar calibration tool 80 may include a first angled end block 82 with calibration insignia printed thereon. End block 82 may support the scale bar calibration tool 80 at a proper angle to be most useful for proper imaging for data points. At the opposite end, a second end block 84 may include a different insignia for proper test data to be taken into consideration. A distance bar 86 physically connects the two insignia printed end blocks and provides a certain distance between the two end blocks.

Figure 8:
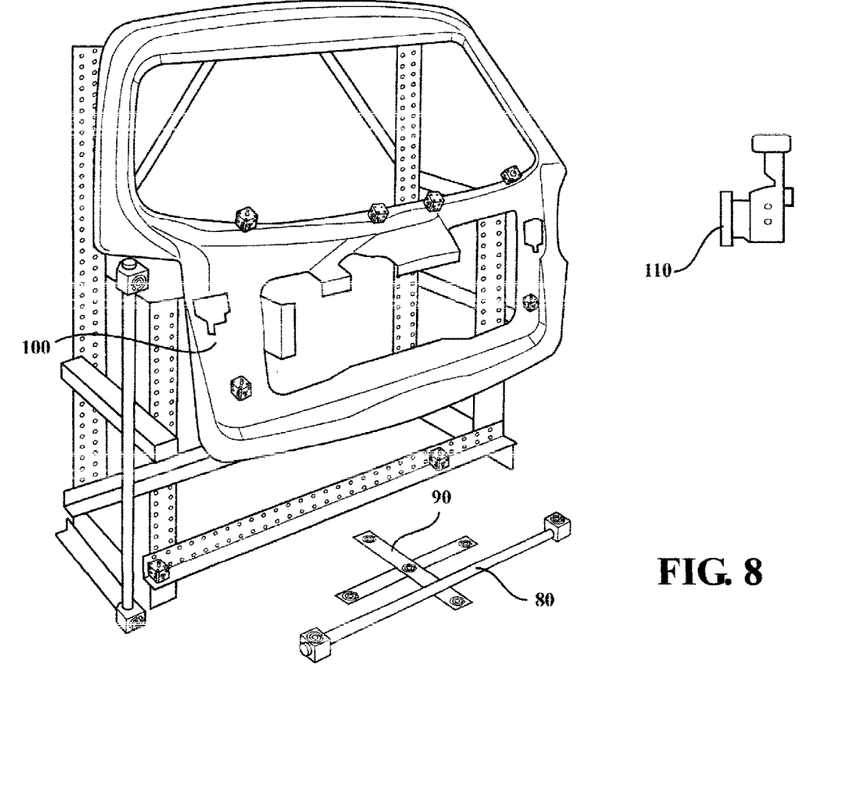
FIG. 8 shows a perspective view of a scale bar calibration tool in placement over a calibration tool next to a test piece.

FIG. 8 illustrates the relative placement of a scale bar calibration tool of FIG. 7 in position near a calibration tool 90. These calibration tools and scale bar calibration tools are set near a work part 100 to calibrate the data being taken by camera 110. Although this aspect of the present invention is shown outside a climate chamber, it is also envisioned that the taking of digital photographs could be performed within such a chamber.

Figure 9:
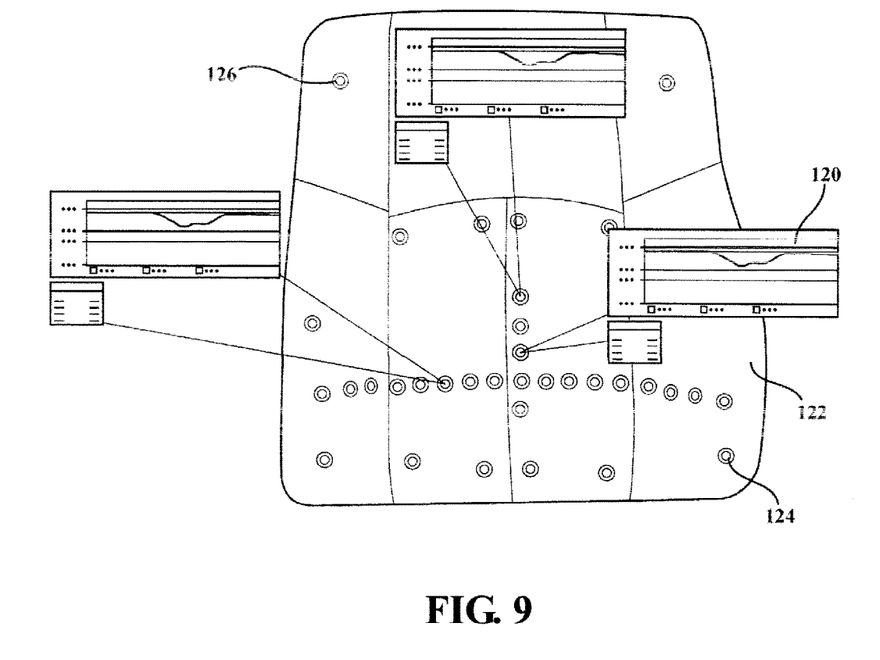
FIG. 9 shows a typical computer screen display with the corresponding overlay charts and data representations.

FIG. 9 shows a typical computer screen display generated when the various calibration tools, scales and blocks of FIGS. 6-8 are used to calibrate position points 124 on a work piece 122. Suitable computer software for producing suitable test result analyses is proprietary software owned by AICON, INC. of Germany, exclusively licensed to the present inventors. This software is most advantageously utilized with cameras purchased or leased from AICON, Inc. of Germany.

In this aspect shown in FIG. 9, the workpiece 122 is a vehicle seat back. The image of FIG. 9 shows what the camera would see, while the display also shows corresponding overlaying charts and graphs 120 illustrating the ongoing data being generated. The computer software generates on-screen vectors 126 that illustrate the direction and magnitude of dimensional expansion and contraction at that particular location of workpiece 122. The various calibration points 124 are used to show where data points can be taken. The computer software being used can generate instantaneous reports and charts for the movement of the workpiece for engineers to report experimental results. As the workpiece 122 expands and contracts in response to any heat, moisture or air pressure changes that might be the subject of the test, the relative location of the calibration points 124 is recorded when compared to the calibration tools or bars or other calibration piece.

Visual observation of the computer display will provide a concrete showing of the workpiece 122 movement by looking at the various vector displays with the corresponding charts and graphs. A strong vector movement is shown as a thick arrow overlaying the corresponding calibration point. When taken with the corresponding graph of dimensional change, the visual depiction of the dimensional change of the work piece responding to the climactic change becomes quite dramatic and is easily discerned. The vectors are visually accurate, and the computer generated graphs provide necessary data for engineering specifications that will need to be met.

2. Method of Dynamically Acquiring Data

A method useful for achieving top experimental data results using the photographic equipment described hereinabove may include the steps of first locating a work piece, and then calibrating the location of calibration tools and/or calibration adapters to measure inside cavities and inner curves of a work piece surface. Mounting work part 28 in a position where data can be taken by a digital camera as shown in FIGS. 1-4 is most helpful. In an aspect of the invention that includes controlled climate change, the climate condition parameters for the test are initiated, and the controlled climate is run through the steps needed to achieve the desired data. For example, if a metal work piece needs to be tested for dimensional changes responding to thermal cycling of the piece, it could be placed into the controlled climate change test chamber, and the heat exchanger would heat the chamber and the work piece while taking digital photographs to record the dimensional changes. Thereafter, the piece would be allowed to cool back down to room temperature and corresponding dimensional changes would be recorded.

The rates of heating and cooling will depend upon the number of cycles desired in a given time period, although heating and cooling will generally be achieved at rates of from about 1 to 100 degrees C. per hour. Humidity testing may be performed by increasing the ambient humidity to the highest test parameter desired, usually on the order of from 0.05% to 300% increase and decreases per hour. Plateaus in the rates mentioned above may occur at any time necessary for data collection for a particular test cycle. Likewise, air pressure may be increased and decreased as quickly or slowly as the desired test may require.

During the test, the computer display shows the computer generated vectors and graphs, illustrating the on-the-fly changes to the operator of the test. As the climate change follows the desired parameters, the expansion and/or corrosion of the work part 28 is recorded, and data is shown to the experimental engineer for him to record the changes in dimension of work part 28.

In this aspect of the invention, work part 28 would be inserted inside of the environmental chamber 30 of FIG. 1, and any of the calibration blocks, tools, or bars are properly situated to most accurately yield data about dimensional changes of the work part 28. For example, FIG. 1 shows how work part 28 may be secured into position relative to calibration tool 32. Then, the heating and cooling device (not shown) may thermally cycle the interior environment of chamber 30 rapidly approximating thermal cycling that a part may experience during its lifetime. In real life, thermal cycling may occur once a day or once a week, whereas during this method, the aging thermal cycling is accelerated to provide dimensional measurements and controls in the above mentioned industries, so that numerous cycles can be achieved in a single day.

The method for utilizing the dimensional measurement and controlling issues may be repeated numerous times in order to get proper experimental data required for the control and measurements. Especially, in one aspect of the invention, within a span of a day, the procedure cycled from −70 degrees Celsius to +170 degrees Celsius, ±50 degrees Celsius with thermal wrappings. For other aspects of the dimensional measurement and control testing, humidity capture can also exist within chamber 30, and expansion and contraction of parts may be measured to a tolerance of 0.050 mm, or 0.002 inches.

Sensors utilized for temperature cycling and humidity change parameters are located within the environmental chamber 30, and would be sending information to the computer through software integration in order to generate appropriate test model data analyses. Suitable sensors include the Sony CCD sensor for providing monochrome and color image quality is used for best advantage, or a similar sensor.

3. The Business Model Aspect of the Invention

The inventors have structured a new business model for establishing an exclusive licensing arrangement to potential licensees by providing the appropriate proprietary climate tolerant data recording equipment described hereinabove, complementary computer software, and a new business model for enabling a service for dynamic data acquisition inside a climate chamber.

On behalf of a potential licensee, the business method includes training the licensee on operation of the complete system, licensing the computer software, leasing or selling the various proprietary camera components to the licensee, and setting up the entire system within a climate chamber that is capable of being reliably and accurately adaptable for various environments. For example, in this business method, a company wishing to test its manufactured work pieces would either purchase or lease the present system including the proprietary computer software and the climate control system in the climate chamber, and follow the prescribed method of this patent application, and any know-how that would be helpful. The licensee would also purchase or lease the proprietary cameras and the novel environmental camera housings for maintaining the integrity of the cameras while changing the environment. Once the system is operated, and the data has been taken, it is transmitted to a computer where the licensed software would make various analyses and display the results on the computer screen to an engineer to be apprised of the various measurements, and what those measurements would mean during the climactic changes that the work piece is subjected to.

This licensee arrangement could also be used for independent testing facilities to be set up, where the licensee would construct a climate chamber at his facility, and attend training from the licensor on how to operate the system. Various manufacturers might not need or want an in-house system, so this arrangement would be ideal for a test that might only be needed occasionally. The licensor would provide all proprietary camera components, computer software, and data taking training. This would provide a licensing type arrangement that could set a licensee up in business.

The foregoing description of a preferred aspect of the invention has been presented for purposes of illustration and description. It is not intended to be exhaustive or to limit the invention to the precise form disclosed. Obvious modifications or variations are possible in light of the above teachings with regards to the specific embodiments. The preferred aspect was chosen and described in order to best illustrate the principles of the invention and its practical applications to thereby enable one of ordinary skill in the art to best utilize the invention in various embodiments and with various modifications as are suited to the particular use contemplated.

What is claimed is:

1. A method for acquiring dynamic data for non-contact dimensional testing, comprising:

providing a work piece;

properly situating at least one calibration tool with respect to the work piece to yield data about dimensional changes of the work piece, wherein various calibration points are used to take data points;

controlling a dynamic condition climate within an environment with climatic changes occurring therein, wherein said dynamic condition climate controlled environment is either open to ambient conditions or within a controlled environment climate chamber and wherein atmospheric variables of the dynamic condition climate environment include humidity, temperature, body component vibrations that may be tested and analyzed, motion and position analyses, and combinations thereof that are implemented therein;

continuously recording dimensional changes of the work piece responding to climatic changes with relation to the at least one calibration tool with at least one high resolution digital camera, said high resolution digital camera being capable of providing computer input data;

exchanging heat and coolness within fluid lines in a conduit for heating or cooling materials that are designed and adapted to keep the at least one high resolution digital camera located within the dynamic condition climate controlled environment at a constant temperature of optimum operation in order to maximize the resolution of the digital images created by the cameras; and continuously receiving and processing the computer input data from the at least one high resolution digital camera by computer software, generating continuous and instantaneous on-screen vector arrows that are shown as thick arrows overlaying a corresponding calibration point, where such vector arrows illustrate a direction and magnitude of dimensional changes due to expansion and contraction at a particular location of the workpiece and said computer software being capable of continuously and instantaneously analyzing the computer input data and generating dynamic computer generated reports to provide three dimensional measurements before, during and after testing so that a complete picture of what happens during an entire cycle of dynamic dimensional changes can be quantified and visually observed.

2. The method of claim 1, wherein the computer software is capturing data on the dimensional changes of the work piece during exposure to atmospheric variables inside the climate chamber.

3. The method of claim 1, wherein intermittent or continuous three dimensional measurements are measured from within the dynamic condition climate controlled environment, whether that environment is open to ambient conditions or within a controlled environment climate chamber.

4. The method of claim 1, wherein the step of analyzing the computer input data takes into consideration any collected data of atmospheric variables selected from the group consisting of humidity, temperature, body component vibrations that may be tested and analyzed, motion and position analyses, and combinations thereof by the high resolution digital cameras continuously feeding measurements into the computer software, whether taken in a static or moving environment within the climate chamber.

\* \* \* \* \*